E. T. BUCKNAM & H. C. LANGREHR.
Fog-Horn.
No. 215,433.                Patented May 20, 1879.
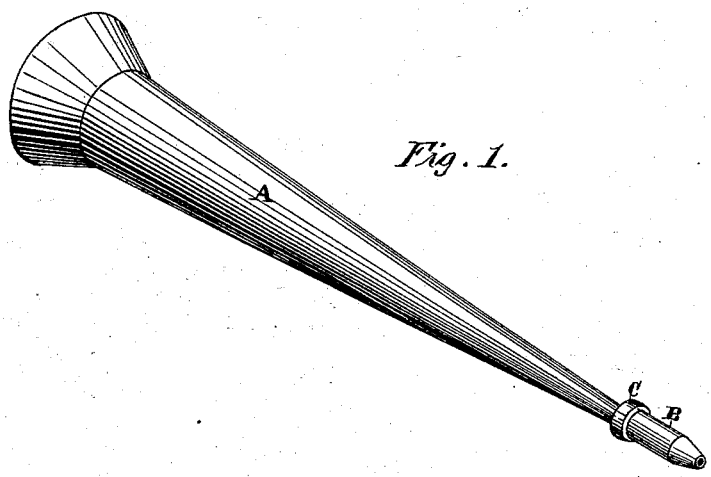
Fig. 1.
Fig. 2.
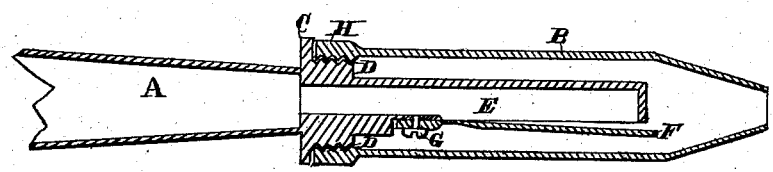

UNITED STATES PATENT OFFICE.

EZRA T. BUCKNAM AND HENRY C. LANGREHR, OF SAN FRANCISCO, CAL.

IMPROVEMENT IN FOG-HORNS.

Specification forming part of Letters Patent No. 215,433, dated May 20, 1879; application filed October 1, 1878.

*To all whom it may concern:*

Be it known that we, EZRA T. BUCKNAM and HENRY C. LANGREHR, of the city and county of San Francisco, and State of California, have invented an Improved Fog-Horn; and we do hereby declare the following to be a full, clear, and exact description thereof, reference being had to the accompanying drawings.

Figure 1 is a view of our invention. Fig. 2 is an enlarged section of the mouth-piece.

Our invention relates to an improved fog-horn, such as is used as a danger-signal on sailing-vessels in foggy weather; and our improvements consist in certain details of construction, as hereinafter set forth and claimed.

In the accompanying drawings, let A represent the bell or mouth of the fog-horn, and B the mouth-piece. A flange or shoulder, C, is formed at the small end of this bell or horn A, and is made of a piece of cast-metal secured to the horn. Forming part of this shoulder or flange, and projecting above it, is a male screw-thread, D, as shown. Projecting upward in the center of this male screw-thread is a square tube, E, the upper end of which is closed, as shown. Its center, however, is hollowed out, so as to form an oblong square cavity. One side of this tube is cut away for part of the distance of its length downward from the top, and in that side where the tube is cut away is secured a reed, F, the upper end of which projects slightly above the top of the tube, so that the compressed air in the mouth-piece may the more readily move it.

The mouth-piece is made cylindrical, the upper end being conical, as shown, for convenience in use.

The reed F is formed of metal, and is secured to the tube by means of a screw, G, at its lower end, as shown. This reed is made pliable, similar to reeds in musical instruments, and is set so as to leave a small space between it and the open sides of the tube E.

The mouth-piece B is formed with a cast flange or shoulder, H, having threads on its inner surface, so that the mouth-piece may be screwed onto the screw-head D, so as to inclose the square tube and reed. The two shoulders or flanges then bear against each other, so that the mouth-piece forms a chamber which incloses the tube and reed. The upper part of the mouth-piece is conical in form for convenience in use, and the tube and reed extend up a short distance into this conical part, as shown. The reed and tube combination with flanges and screws are made of cast-brass or other metal, and are brazed to a horn of sheet-brass or tin.

We are aware that horns have been made heretofore with a removable mouth-piece surrounding the reed; and we are also aware of the fact that horns have heretofore been made with reeds removable from the tubes, and hence we do not claim these features broadly; but,

Having thus described our invention, what we claim as new, and desire to secure by Letters Patent, is—

The removable mouth-piece B and tube E, in combination with a removable reed, F, extending above the end of the tube, as set forth.

In witness whereof we have hereunto set our hands.

EZRA T. BUCKNAM.
HENRY C. LANGREHR.

Witnesses:
FRANK A. BROOKS,
CHAS. G. YALE.